United States Patent
Hayashi et al.

(10) Patent No.: US 10,288,104 B2
(45) Date of Patent: May 14, 2019

(54) BLIND RIVET AND METHOD FOR FASTENING SAME

(71) Applicant: NEWFREY LLC, New Britain, CT (US)

(72) Inventors: Masahiro Hayashi, Toyohashi (JP); Kanji Sakoda, Toyohashi (JP)

(73) Assignee: NEWFREY LLC, New Britain, CT (US)

( * ) Notice: Subject to any disclaimer, the term of this patent is extended or adjusted under 35 U.S.C. 154(b) by 290 days.

(21) Appl. No.: 15/412,191

(22) Filed: Jan. 23, 2017

(65) Prior Publication Data

US 2017/0130756 A1    May 11, 2017

Related U.S. Application Data

(63) Continuation of application No. PCT/JP2015/069738, filed on Jul. 9, 2015.

(30) Foreign Application Priority Data

Jul. 24, 2014   (JP) .................................. 2014-150619

(51) Int. Cl.
   *F16B 13/04*    (2006.01)
   *F16B 19/10*    (2006.01)
   *B21J 15/04*    (2006.01)

(52) U.S. Cl.
   CPC ............. *F16B 19/10* (2013.01); *B21J 15/043* (2013.01); *F16B 19/1054* (2013.01)

(58) Field of Classification Search
   CPC ..... F16B 19/10; F16B 19/1054; B21J 15/045; B21J 15/043

USPC ................................................ 411/34, 42, 43
See application file for complete search history.

(56) References Cited

U.S. PATENT DOCUMENTS

| | | | | |
|---|---|---|---|---|
| 2,538,623 | A | * | 1/1951 | Keating .............. F16B 19/1054  29/512 |
| 2,803,984 | A | * | 8/1957 | Swenson ............. F16B 19/1054  29/511 |
| 4,230,017 | A | * | 10/1980 | Angelosanto ........... F16B 19/05  411/34 |
| 4,473,914 | A | * | 10/1984 | Haft ........................ B21J 15/02  29/520 |

(Continued)

FOREIGN PATENT DOCUMENTS

JP        2009-180347 A    8/2009

*Primary Examiner* — Gary W Estremsky
(74) *Attorney, Agent, or Firm* — Kofi A. Schulterbrandt; Michael P. Leary

(57) ABSTRACT

A blind rivet including a sleeve and a flange on one end of the sleeve, and a mandrel including a shaft and a head, the head having a cutting edge for cutting open the sleeve. The sleeve of the rivet body has a thick portion, and a thin which has an inner diameter larger than the thick portion. The shaft of the mandrel has a large diameter portion, a middle diameter portion, a small diameter portion having an outer diameter smaller than the middle diameter portion, and a securing and attaching groove which is between the middle diameter portion and the small diameter portion. When the blind rivet is fastened, the middle diameter portion of the mandrel causes the material of the thick portion to undergo metal flow and to flow into the securing and attaching groove, enabling the mandrel to be tightly secured to the rivet body.

7 Claims, 5 Drawing Sheets

(56) References Cited

U.S. PATENT DOCUMENTS

| | | | | |
|---|---|---|---|---|
| 4,702,655 A | * | 10/1987 | Kendall | F16B 19/1054 |
| | | | | 29/523 |
| 4,784,551 A | * | 11/1988 | Kendall | F16B 19/1054 |
| | | | | 411/34 |
| 4,844,673 A | * | 7/1989 | Kendall | F16B 19/1054 |
| | | | | 411/34 |
| 4,863,325 A | | 9/1989 | Smith | |
| 4,904,133 A | * | 2/1990 | Wright | B21J 15/045 |
| | | | | 29/512 |
| 4,907,922 A | * | 3/1990 | Jeal | F16B 19/1054 |
| | | | | 411/34 |
| 4,909,687 A | * | 3/1990 | Bradley | F16B 19/1054 |
| | | | | 411/43 |
| 6,077,009 A | * | 6/2000 | Hazelman | B21J 15/043 |
| | | | | 411/34 |
| 6,898,918 B2 | * | 5/2005 | Eshraghi | F16B 5/01 |
| | | | | 156/293 |
| 6,905,296 B2 | * | 6/2005 | Millington | F16B 19/1054 |
| | | | | 411/43 |

* cited by examiner

BLIND RIVET AND METHOD FOR FASTENING SAME

CROSS-REFERENCE TO RELATED APPLICATIONS

This application is a continuation of PCT/JP2015/069738, filed Jul. 9, 2015 which claims priority from Japanese Patent Application No. 2014-150619, filed Jul. 24, 2014, the disclosure of which is incorporated herein by reference in its entirety.

FIELD OF THE INVENTION

The present invention pertains to a blind rivet and, in particular, to a peel type blind rivet and a method for fastening same.

BACKGROUND OF THE INVENTION

Blind rivets which are comprised of a hollow metal rivet body with a sleeve, a flange formed on one end of the sleeve, and a metal mandrel with a shaft that passes through and projects out from a through hole in the rivet body, are well known. An advantage of blind rivets is that they can be used to join multiple workpieces, working from one side only.

The rivet body of a blind rivet has a flange formed on one end and a hollow, tubular sleeve which extends from the flange. The mandrel of the blind rivet has a long, narrow shaft which passes through the rivet body, and a mandrel head on the end of the shaft, which has an outer diameter larger than the inner diameter of the sleeve. The mandrel head is disposed contiguously on one end of the sleeve, on the side opposite the flange; the blind rivet is assembled by inserting the shaft of the mandrel in the through hole of the rivet body so that the shaft of the mandrel projects from the flange.

The assembled blind rivet is inserted into the hole of a workpiece such as a panel or the like, with the head of the mandrel going first, and the flange is made to abut the circumference of the hole of the workpiece. The flange is held by a fastening tool; when pulled strongly from the flange side while gripping the shaft of the mandrel, one end of the sleeve of the rivet body undergoes deformation by expanding in diameter, and the mandrel breaks at a narrow, breaking portion of the shaft. The workpiece can be fastened between the flange and the expanded diameter portion of the sleeve.

Blind rivets can be a peel type blind rivets in which cutting edges are formed on the surface of the mandrel head on the shaft side; during fastening, the cutting edges expand the diameter of one end of the sleeve of the rivet body by cutting it. Because a peel type blind rivet expands the diameter of one end of the sleeve by cutting it open, it is possible to fasten a workpiece by greatly expanding the diameter of one end of the sleeve.

However, because a peel type blind rivet uses the cutting edges of a mandrel head to cut open one end of the sleeve, this easily causes the defect of breakage if the mandrel is not pulled out in a steady and even fashion. Also, the length over which the cutting edges cut into the sleeve is variable, and if cutting is excessive, the broken portion of the mandrel shaft may project from the flange side of the rivet body. Also, when the sleeve is cut, great stresses are applied to the mandrel head and to the sleeve, and as a result, the mandrel head may fall off.

JP Patent Publication 2009-180347 discloses a peel type blind rivet having a rivet body comprised of a cylindrical barrel and a flange-shaped head formed on one end of the barrel; a shaft that is inserted in and passes through the rivet body; a large diameter head formed on one end of the shaft; and a neck portion formed on the mandrel, which is used for breaking. The inner diameter portion of the blind rivet of 2009-180347 has a large diameter portion on the barrel side and a small diameter portion on the side of the head. The mandrel has a rough, indented and raised portion on the surface of the shaft between the head and the neck, which is formed along the lengthwise direction of the shaft. When the fastening is completed, the raised portion of the mandrel wedges into the inner surface of the small diameter portion of the rivet body, securing it strongly, thus preventing the mandrel from falling off. The indented and raised portion has the shape of a saw blade, and the surface of the raised portion on the neck side is slanted, so that the load needed when the mandrel is inserted into the rivet body is small.

However, machining the raised and indented portion in the mandrel of the blind rivet of 2009-180347 requires effort and is costly.

Also, in order to have the raised portion of the mandrel wedge into the inner surface of the small diameter portion of the rivet body, it is necessary to pull in the mandrel until the raised portion which is contiguous to the mandrel head goes over the large diameter portion of the rivet body and reaches the small diameter portion. For that reason, a large load is needed to pull the mandrel in, and it is not possible to prevent the rivet body from breaking. Furthermore, the head of the mandrel may fall off when a thick workpiece is fastened.

JP Patent Publication 59-131012 discloses a blind fastener (blind rivet) which is provided with a hollow sleeve having a sleeve shaft and a large sleeve head, and a pin (the mandrel) having a shaft and a thick head portion. Although the blind rivet of 59-131012 widens the shaft portion of a sleeve by means of the head portion of a pin, it is not a peel type blind rivet.

The blind rivet of 59-131012 uses the portion of the through hole of the sleeve that has a narrow diameter as a stop shoulder, and a securing groove is formed in the pin. During fastening, the head portion of the pin widens the end of the sleeve shaft and moves through the center of the sleeve shaft. When the stop shoulder enters the securing groove, the movement of the pin stops; when the relative force applied to the pin and the sleeve reach a pre-determined level, the pin breaks at a breaking groove on the neck.

The blind fastener of 59-131012 strongly secures the pin and sleeve since they are secured mechanically by means of the movement of the stop shoulder of the sleeve into the securing groove of the pin.

However, in the blind fastener of 59-131012, when the stop shoulder of the sleeve and the securing groove of the pin are in the same position in the axial direction, the material of the stop shoulder of the sleeve flows into the securing groove of the pin and is secured. As a result, this determines the relative position in which the sleeve and pin can be secured. For this reason, the range of thicknesses for the components to be attached is narrow, and as a result, a problem arises in that the workpiece cannot be fastened if it is thicker or thinner than this range of thickness(es).

For this reason, a peel type blind rivet is sought in which, during fastening, breakage of the rivet body is controlled, the broken portion of the mandrel does not project from the surface on the flange side, and the mandrel head does not fall off such that fastening can be done in a controlled manner.

In addition, a peel type blind rivet is sought which can fasten workpieces with a broad range of thicknesses.

BRIEF SUMMARY OF THE INVENTION

Accordingly, the object of the present invention is to offer a peel type blind rivet peel which can fasten in a stable, controlled manner, with no defects in the fastening. In addition, the present invention offers a peel type blind rivet which can fasten workpieces having a broad range of thicknesses.

In order to achieve this object, the sleeve of the rivet body of the blind rivet of the present invention has a thick portion which is contiguous to the flange and a thick portion on the side of the sleeve end. In the mandrel, cutting edges are formed on the shaft side of the mandrel head, and the shaft has a large diameter portion, a middle diameter portion, a small diameter portion and a breaking portion. A securing and attaching groove is placed between the middle diameter portion and the small diameter portion. The outer diameter of the middle diameter portion of the mandrel is smaller than the inner diameter of the thin portion of the rivet body, and larger than the inner diameter of the thick portion. When the blind rivet is fastened, the middle diameter portion of the mandrel causes the material of the thick portion of the rivet body to undergo metal flow and enter into the securing and attaching groove, and the mandrel is strongly secured.

The first embodiment of the present invention is a blind rivet which is provided with a rivet body having a hollow sleeve and a flange formed on one end of the sleeve, and in which a through hole is formed that passes through from the sleeve side end to the flange side end; a mandrel that has a narrow shaft having an outer diameter smaller than the inner diameter of the sleeve, and a mandrel head having an outer diameter larger than the inner diameter of the sleeve, in which cutting edges are formed on the shaft side of the mandrel head for cutting open the sleeve. This blind rivet is characterized by the fact that the sleeve of the rivet body has a thick portion that is contiguous to the flange, a thin portion that is placed on the side of the end of the sleeve, and an inner diameter larger than the thick portion. Furthermore, the shaft of the mandrel has a large diameter portion which is contiguous to the cutting edges, a middle diameter portion that is contiguous to the large diameter portion having an outer diameter smaller than the large diameter portion, a small diameter portion having an outer diameter smaller than the middle diameter portion, a breaking portion having an outer diameter smaller than the small diameter portion, and an attaching and securing groove that is positioned between the middle diameter portion and the small diameter portion, having an outer diameter smaller than the small diameter portion.

The sleeve of the rivet body has two portions with different inner diameters: a thick portion and a thin portion. The shaft of the mandrel has three portions with different outer diameters: the large diameter portion, the middle diameter portion and the small diameter portion. If a securing and attaching groove is placed between the middle diameter portion and the small diameter portion, the middle diameter portion of the mandrel can cause the thick portion of the rivet body to undergo metal flow into the securing and attaching groove by suitably configuring the inner diameter dimensions of the thick portion and the thin portion of the rivet body, and the outer diameter dimensions of the large diameter portion, the middle diameter portion and the small diameter portion of the mandrel.

It is desirable for the outer diameter of the large diameter portion to be equal to or larger than the inner diameter of the thin portion and for the outer diameter of the middle diameter portion to be smaller than the inner diameter of the thin portion and larger than the inner diameter of the thick portion. If the outer diameter of the large diameter portion is equal to or larger than the inner diameter of the thin portion, the large diameter portion matches the thin portion of the rivet body exactly, and it is possible to insert the shaft of the mandrel into the through hole of the rivet body in a straight manner. If the outer diameter of the middle diameter portion is smaller than the inner diameter of the thin portion and larger than the inner diameter of the thick portion, the middle diameter portion passes through the thin portion without planing it off, but planes off the thick portion, causing it to undergo metal flow into the securing and attaching groove.

It is desirable for the outer diameter of the small diameter portion to be smaller than the inner diameter of the thick portion. If the outer diameter of the small diameter portion is smaller than the inner diameter of the thick portion, the small diameter portion does not plane off the inside of the thick portion of the rivet body, but the middle diameter portion planes off the inside of the thick portion, and as a result, the material which is planed off from the inside of the thick portion enters the securing and attaching groove smoothly.

It is desirable that part of the material of the thick portion enter the securing and attaching groove and that the mandrel head be secured and attached to the rivet body. If part of the material of the thick portion enters the securing and attaching groove, the rivet body and the mandrel can be secured mechanically.

It is desirable that the breaking portion of the mandrel break off after the mandrel head is secured and attached to the rivet body.

A second embodiment of the present invention is a mandrel which, together with a rivet body comprised of a hollow sleeve and a flange formed on one end of the sleeve, forms a blind rivet. The mandrel is characterized by the fact that it has a long, narrow shaft, a mandrel head with an outer diameter larger than the shaft and cutting edges on the shaft side of the mandrel head for cutting open the sleeve. The shaft has a large diameter portion that is contiguous to the cutting edges, a middle diameter portion having an outer diameter smaller than the large diameter portion, a small diameter portion having an outer diameter smaller than the middle diameter portion, a breaking portion having an outer diameter smaller than the small diameter portion, and a securing and attaching groove having an outer diameter smaller than the small diameter portion, and positioned between the middle diameter portion and the small diameter portion.

The shaft of the mandrel has three portions which have different diameters: the large diameter portion, the middle diameter portion and the small diameter portion. If a securing and attaching groove is formed between the middle diameter portion and the small diameter portion and this is combined with a rivet body having an inner diameter with a stepped portion, the material of the rivet body can be made to metal flow so that it enters the securing and attaching groove.

A third embodiment of the present invention is a method of using a blind rivet to fasten a workpiece with a hole, wherein method is characterized by the fact it is provided with a step in which a rivet body and a mandrel are prepared, the rivet body having a hollow sleeve with a thick portion and a thin portion which has an inner diameter larger than the thick portion, a flange formed on one end of the sleeve and a through hole is formed in the rivet body which penetrates through from the sleeve side end to the flange side end. The mandrel is comprised of a shaft and a mandrel head, the shaft having a large diameter portion which is contiguous to the mandrel head, a middle diameter portion which is contiguous to the large diameter portion, and an outer diameter smaller than the large diameter portion; a small diameter portion having an outer diameter smaller than the middle diameter portion; a breaking portion having an outer diameter smaller than the small diameter portion, and a securing and attaching groove between the middle diameter portion and the small diameter portion, having an outer diameter smaller than the small diameter portion. The outer diameter of the mandrel head is larger than the inner diameter of the sleeve, and cutting edges are formed on the shaft side for cutting open the sleeve. The blind rivet consists of assembling the rivet body and mandrel so that the shaft of the mandrel passes through the through hole of the rivet body and projects out from the flange side end. The blind rivet is inserted into the attaching hole of the workpiece from the mandrel head, and the sleeve side surface of the flange is made to abut the periphery of the attaching hole of the workpiece. The shaft of the mandrel is pulled out from the flange side while supporting the flange, and the end of the sleeve is cut open by the cutting edges of the cutting edge portion and expands in diameter. Part of the material of the thick portion enters the securing and attaching groove. Since the mandrel and rivet body are joined, the mandrel breaks at the breaking portion, and the workpiece is fastened between the end portion of the sleeve which has expanded in diameter and the flange.

The present invention makes it possible to achieve a peel type blind rivet which fastens securely, without any defects in the fastening. Additionally, it is possible to achieve a peel type blind rivet which can fasten a broad range of thicknesses.

DETAILED DESCRIPTION OF THE INVENTION

Figure 1:
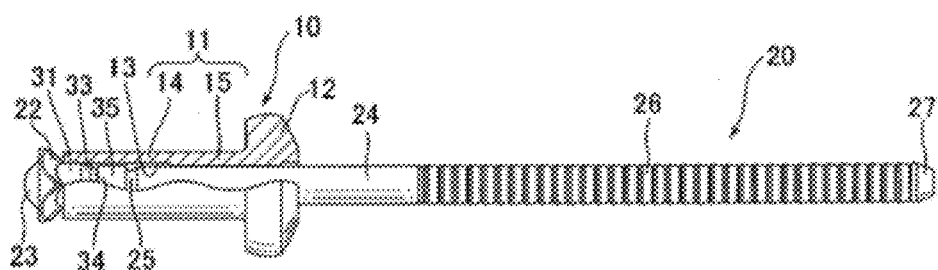
FIG. 1 is a front elevational view which shows part of the blind rivet which is the working example of the present invention, in cross section.

Next, a blind rivet according to embodiments of the present invention will be explained by referring to the Drawings.

FIG. 1 is a front elevational view showing part of the blind rivet which is an embodiment of the present invention, in cross section. The blind rivet is provided with a rivet body 10 and a mandrel 20. Mandrel 20 is inserted from the sleeve side end of rivet body 10 into through hole 13 of rivet body 10, and mandrel head 23 of mandrel 20 is placed so as to be contiguous with the sleeve side end of rivet body 10.

Next, rivet body 10 and mandrel 20 which form the blind rivet in the working example of the present invention will be explained by referring to FIGS. 2 and FIGS. 3A-3D.

Figure 2:
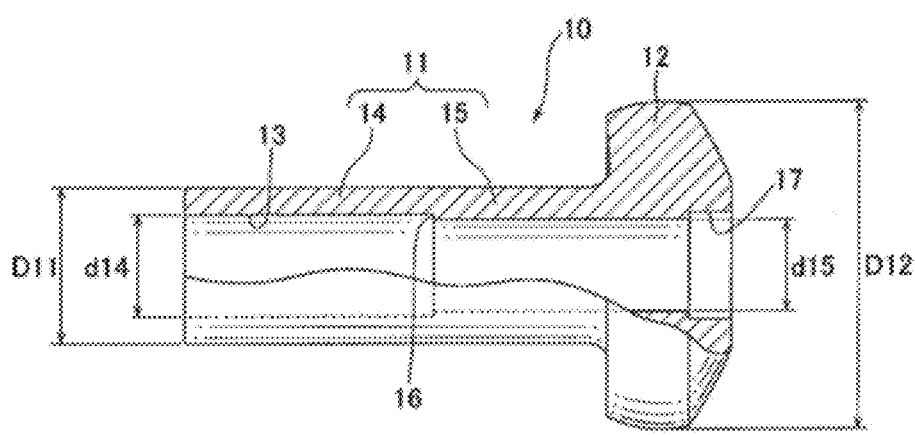
FIG. 2 is a front elevational view which shows part of the rivet body of the blind rivet of FIG. 1, in cross section.

FIG. 2 is a front elevational view of part of rivet body 10 which is used in the blind rivet of the working example of the present invention, shown in cross section. Rivet body 10 includes a sleeve 11 and a flange 12 which is formed on one end of sleeve 11 and which is larger in diameter than sleeve 11. The outer diameter of flange 12, D12, is larger than the inner diameter of the attaching hole of the workpiece.

A spotface 17 is formed on the flange side end of rivet body 10. Even if spotface 17 undergoes deformation when the flange side end is compressed with an attaching tool, the mandrel can be pulled out. Sleeve 11 has a thick portion 15 which is contiguous to flange 12, and a thin portion 14 which is placed on the sleeve side end, and is thinner than thick portion 15. A stepped portion 16 is between thick portion 15 and thin portion 14 in through hole 13.

Through hole 13 extends between the flange side end of rivet body 10 and the sleeve side end. Through hole 13 extends through thick portion 15 and thin portion 14. The outer diameter of thick portion 14 and thin portion 14 is D11. The inner diameter of thick portion 15 is d15. The inner diameter of thin portion 14 is d14 and is larger than d15.

The outer diameter D11 of sleeve 11 is smaller than the inner diameter of the attaching hole of the workpiece and is of a size that can pass through the attaching hole. Rivet body 10 is made from a material which is softer than mandrel 20, for example, aluminum or an aluminum alloy. Or, in addition, it may be made from steel or the like, as is mandrel 20.

Figure 3A:
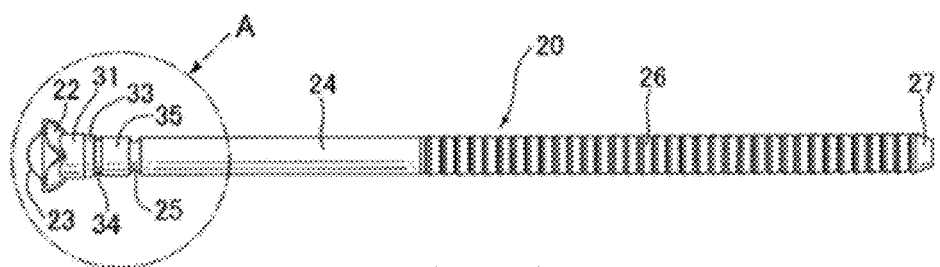
FIG. 3A is a front elevational view of the mandrel of the blind rivet in FIG. 1.
Figure 3B:
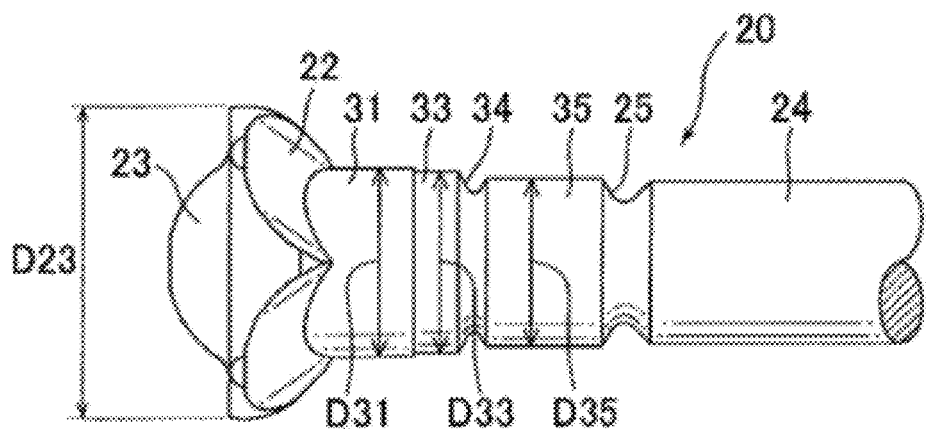
FIG. 3B is an enlarged view of the portion of FIG. 3A which is enclosed by A.
Figure 3C:
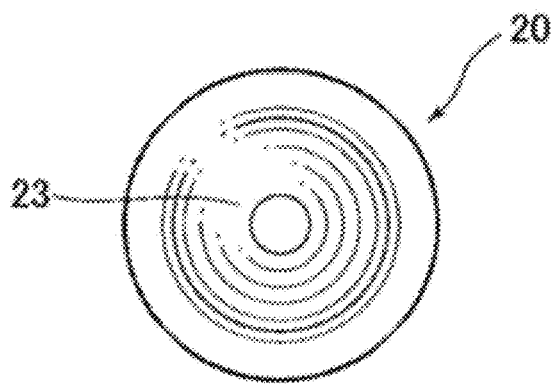
FIG. 3C is a left side view of the mandrel in FIG. 3A.
Figure 3D:
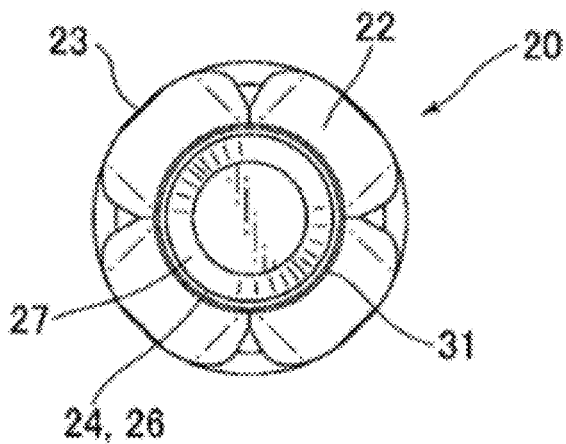
FIG. 3D is a right side view of the mandrel in FIG. 3A.

FIG. 3A is a front elevational view of mandrel 20 which forms the blind rivet in the working example of the present invention. FIG. 3B is an enlarged view of the portion of FIG. 3A which is enclosed by A. FIG. 3C is a left side view of mandrel 20, and FIG. 3D is a right side view of mandrel 20. The scaling in FIGS. 3C and 3D is the same scaling used in FIG. 3B. Mandrel 20 is provided with a long, narrow shaft; a mandrel head 23 on the opposite end of the shaft, and a cutting edge portion 23 is provided on the shaft side of mandrel head 23.

As shown in FIG. 3B and in FIG. 3C, the shape of the center portion of mandrel head 23 is such that it is roundest and protrudes the most in the direction of the center axis. The outer diameter D23 of mandrel head 23 is larger than the inner diameter d14 of thin portion 14 of rivet body 10. The outer diameter D23 of mandrel head 23 is smaller than the inner diameters of attaching holes 43, 44 of workpieces 41, 42 and can pass through attaching holes 43, 44 of workpieces 41, 42.

Mandrel head 23 is provided with a cutting edge portion 22 of the shaft side. Cutting edge portion 22 is provided with multiple cutting edges which radiate outward at a fixed angle relative to the center axis. In the example shown, four cutting edges are placed at equal intervals in the circumferential direction. When the blind rivet is fastened, this enables the cutting edges to cut open thin portion 14 of rivet body 10 from the end.

Starting from the side of mandrel head 23, the shaft of mandrel 20 has a large diameter portion 31, a middle diameter portion 33, a securing and attaching groove 34 and a small diameter portion 35. After small diameter portion 35, the shaft of mandrel 20 also has a breaking portion 25, a columnar portion 24, a grip 26 and a tip 27.

Contiguous to the cutting edge portion 22 on the shaft side of mandrel head 23, there are, in the following order: large diameter portion 31, middle diameter portion 33, securing and attaching groove 34 and small diameter portion 35. The outer diameter D31 of large diameter portion 31 is equal to or slightly larger than the inner diameter d14 of thin portion 14. Large diameter portion 31 of mandrel 20 matches thin portion 14 of rivet body 10 precisely. When the blind rivet is fastened, the center axis of mandrel 20 is guided by means of large diameter portion 31 so that is does not become out of alignment with the center axis of rivet body 10, and mandrel 20 does not deviate or incline to one side. As a result, cutting edge portion 22 can cut open the end of thin portion 14 of rivet body 10 uniformly.

Middle diameter portion 33 is contiguous to large diameter portion 31. The outer diameter D33 of middle diameter portion 33 is slightly smaller than the outer diameter D31 of large diameter portion 31. There is a stepped portion between large diameter portion 31 and middle diameter portion 33. By making a tapered portion between large diameter portion 31 and middle diameter portion 33, it is also possible to make the outer diameter change gradually from large diameter portion 31 to middle diameter portion 33.

Outer diameter D33 of middle diameter portion 33 is slightly smaller than the inner diameter d14 of thin portion 14 of rivet body 10. When mandrel 20 and rivet body 10 are assembled, large diameter portion 31 precisely matches the inner diameter d14 of thin portion 14, and, as a result, middle diameter portion 33 does not contact the inside of thin portion 14, so there is no planing of the inside of thin portion 14.

Outer diameter 33D of middle diameter portion 33 is slightly larger than inner diameter d15 of thick portion 15 of rivet body 10. Securing and attaching groove 34 is placed contiguous to middle diameter portion 33 and is smaller in diameter than middle diameter portion 33. If middle diameter portion 33 of mandrel 20 is pulled inside thick portion 15 of rivet body 10, part of the material of thick portion 15 is pushed by middle diameter portion 33 and undergoes metal flow, entering securing and attaching groove 34. As a result, the blind rivet can be strongly secured.

If middle diameter portion 33 enters thick portion 15 only slightly and thick portion 15 is planed off, the material of thick portion 15 enters securing and attaching groove 34. If middle diameter portion 33 is pulled farther into the inside of thick portion 15 of rivet body 10, it is possible to advance close to flange 12 while planing off thick portion 15. Middle diameter portion 33 advances through thick portion 15 and is strongly secured in the position where it stops. There is a wide range of relative positions where mandrel 20 and rivet body 10 can be secured. Accordingly, workpieces with a wide range of thicknesses can be attached.

A small diameter portion 35 is placed contiguous to securing and attaching groove 34, having a diameter larger than securing and attaching groove 34, but smaller than middle diameter portion 33. The outer diameter D35 of small diameter portion 35 is smaller than the inner diameter d15 of thick portion 15 of rivet body 10. When the blind rivet is fastened, small diameter portion 35 does not plane off the material of thick portion 15 of rivet body 10.

As stated above, the size relationships for outer diameter D31 of large diameter portion 31 of mandrel 20, outer diameter D33 of middle diameter portion 33, outer diameter D35 of small diameter portion 35, inner diameter d14 of thin portion 14 of rivet body 10 and inner diameter d15 of thick portion 15 of rivet body 10 are as shown in the following table.

TABLE 1

Size Relationship for Each Dimension

|  | Inner Diameter of Thin Portion d14 | Inner Diameter of Thick Portion d15 |
| --- | --- | --- |
| Outer diameter of large diameter portion D31 | D31 ≥ d14 | D31 > d15 |
| Outer diameter of middle diameter portion D33 | D33 < d14 | D33 > d15 |
| Outer diameter of small diameter portion D35 | D35 < d14 | D35 < d15 |

In the working example, each of the dimensions given above is as follows.

TABLE 2

Dimensions in the Working Example

| Part | Location on the Part | Dimension (mm) |
| --- | --- | --- |
| Mandrel 20 | Outer diameter D31 of large diameter portion 31 | 2.5 |
|  | Outer diameter D33 of middle diameter portion 33 | 2.4 |
|  | Outer diameter D35 of small diameter portion 35 | 2.2 |
| Rivet body 10 | Inner diameter d14 of thin portion 14 | 2.5 |
|  | Inner diameter d15 of thick portion 15 | 2.25 |

A breaking portion 25 is contiguous to small diameter portion 35, which has an outer diameter smaller than small diameter portion 35. It is on the portion housed in through hole 13 of rivet body 10 when the blind rivet is assembled. When the shaft of mandrel 20 is pulled out by the fastening tool, breaking portion 25 breaks when a predetermined extraction force is exceeded. The outer diameter of breaking portion 25 is smaller than the outer diameter of securing and attaching groove 34.

A columnar-shaped columnar portion 24 is contiguous to breaking portion 25 and is larger in diameter than breaking portion 25, but smaller in diameter than small diameter portion 35. A grip 26 is contiguous to columnar portion 24. The outer diameter of grip 26 is approximately equal to the outer diameter of columnar portion 24. Grip 26 is formed with multistage locking grooves, so that it does not slip when gripped by gripping component 51 of the fastening tool. The end of tip portion 27 of the shaft narrows, so that the end is narrow enough to be inserted into the fastening tool easily. Mandrel 20 is made from steel, or the like.

Figure 4A:
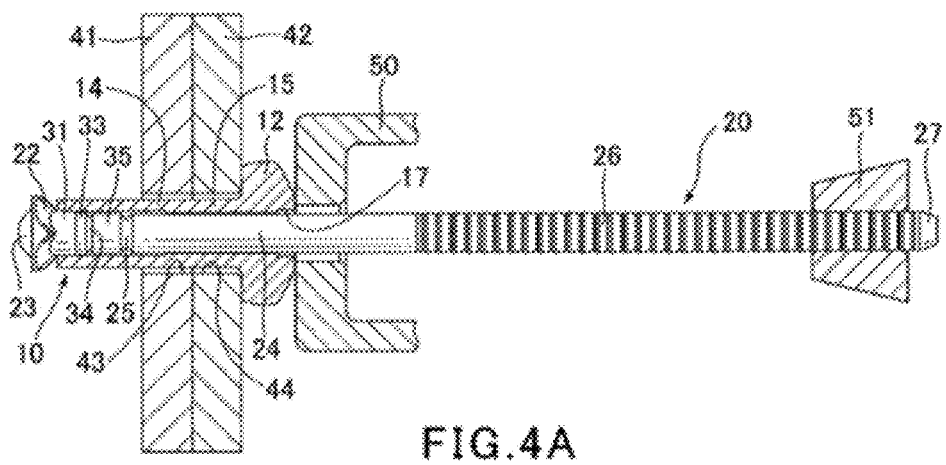
FIG. 4A is a cross sectional view of the blind rivet in FIG. 1 according to the working example of the present invention, attached in the attaching hole of a workpiece.

Next, the operation of fastening workpieces 41,42 using the blind rivet which is the working example of the present invention in FIG. 1 will be explained, by referring to FIGS. 4A and 4B. FIG. 4A is a cross-sectional diagram of the blind rivet of FIG. 1 showing it placed into workpieces 41, 42. The left side of FIG. 4A is the blind side, and the operation of attaching the blind rivet is done from the right side.

Workpieces 41, 42 overlap so that attaching hole 43 of workpiece 41 and attaching hole 44 of workpiece 42 overlap. The blind rivet shown in FIG. 1 is prepared by combining rivet body 10 and mandrel 20. The surface of nose piece 50 of the attaching tool is made to abut the flange side end of rivet body 10. Grip 26 of mandrel 20 is gripped by gripping component 51 of the attaching tool. The blind rivet of FIG. 1 is inserted into attaching holes 43, 44 of workpieces 41, 42 from the right side in FIG. 4A, and mandrel head 23 and thin portion 14 project from attaching holes 43, 44, so that the sleeve side surface of flange 12 abuts the surface of the periphery of attaching hole 44 of workpiece 42.

Figure 4B:
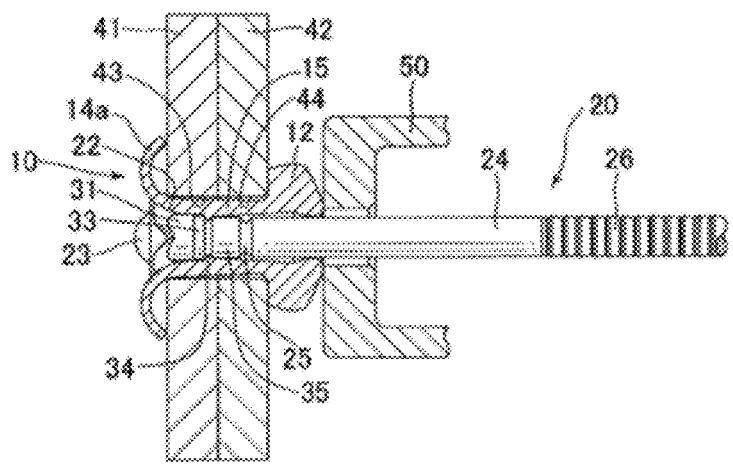
FIG. 4B is a cross sectional view of the intermediate stage in fastening a workpiece by means of the blind rivet in FIG. 1.

FIG. 4B is a cross-sectional diagram showing the stage in which workpieces 41, 42 have been fastened by means of the blind rivet, before mandrel 20 has been broken off at breaking portion 25. The flange side end of rivet body 10 is held by nose piece 50, and grip 26 of mandrel 20 is pulled out by gripping it with gripping component 51 of the attaching tool. The cutting edges of cutting edge portion 22 which are contiguous to mandrel head 23 of mandrel 20 then cut open the sleeve side end of sleeve 11 of rivet body 10 to form expanded diameter portion 14a, and the tip portion of expanded diameter portion 14a widens.

The flange side end of rivet body 10 is pushed by nose piece 50, and, as a result, the inner diameter of spotface 17 decreases. However, because spotface 17 is made with a large inner diameter, it does not undergo deformation until it abuts columnar portion 24.

The end of middle diameter portion 33 of mandrel 20 abuts the end of thick portion 15. If mandrel 20 is pulled out farther, part of the material of thick portion 15 of rivet body 10 is pushed at middle diameter portion 33 of mandrel 20 and, by undergoing metal flow, enters into securing and attaching groove 34. Even though securing and attaching groove 34 is filled, it is possible to continue pulling out mandrel 20 farther relative to rivet body 10.

Cutting edge portion 22 of mandrel 20 continues to cut open thin portion 14, and if mandrel head 23 nears the surface of workpiece 41, mandrel 20 cannot be pulled in farther. The movement of mandrel 20 relative to rivet body 10 is stopped, and the operation of cutting open thin portion 14 also stops. In FIG. 4B, the tip portion of expanded diameter portion 14a abuts the periphery of attaching hole 43 of workpiece 41. Workpieces 41, 42 are clamped between expanded diameter portion 14a of the blind rivet, which has been given an expanded diameter, and flange 12.

Whether the fastening is done with the tip of expanded diameter portion 14a abutting the surface of the periphery of attaching hole 43 of workpiece 41 or is done without it abutting the same depends mainly on the board thickness of the workpiece and the length of thin portion 14. There are instances in which the board thickness of workpieces 41, 42 is thick and mandrel head 23 nears the surface of workpiece 41 before the tips of expanded diameter portion 14a abut the surface of workpiece 41, and the mandrel cannot be pulled in farther. In that case, when the blind rivet is attached, the tips of expanded diameter portion 14a do not abut the surface of workpiece 41.

When the board thickness of workpieces 41, 42 is thin, the tips of expanded diameter portion 14a abut the surface of workpiece 41 before mandrel head 23 nears the surface of workpiece 41, and the mandrel cannot be pulled in farther.

Wherefore, if mandrel 20 is forcibly pulled out farther, mandrel 20 breaks at breaking portion 25. The side of mandrel head 23, from breaking portion 25, remains in the fastened portion. Then, the fastening is completed by withdrawing nose piece 50 towards the right in FIG. 4B.

Figure 5:
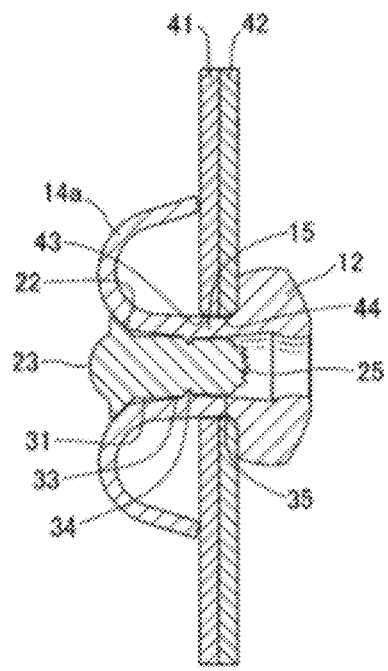
FIG. 5 is a cross sectional view after a thin workpiece has been fastened by means of the blind rivet in FIG. 1.

FIG. 5 is a cross-sectional diagram showing thin workpieces 41, 42 fastened by means of the blind rivet of the working example of the present invention. Flange 12 of rivet body 10 abuts the surface of the periphery of attaching hole 44 of workpiece 42. Thick portion 15 passes through attaching holes 43, 44 of workpieces 41, 42. Thin portion 14 is bent, having been cut open and split by cutting edge portion 22 of mandrel 20. Thin portion 14 which has been cut open and split becomes expanded diameter portion 14a and is bent in a curve; the tips abut the surface of the periphery of attaching hole 43 of workpiece 41. There is still some distance between mandrel head 23 and the surface of workpiece 41.

Part of the material of thick portion 15 of rivet body 10 is planed off by middle diameter portion 33 of mandrel 20 and enters securing and attaching groove 34; rivet body 10 and the remainder of mandrel 20 are tightly secured. The securing and attaching groove 34 of mandrel 20 is not pulled within attaching holes 43, 44 of workpieces 41, 42.

Figure 6:
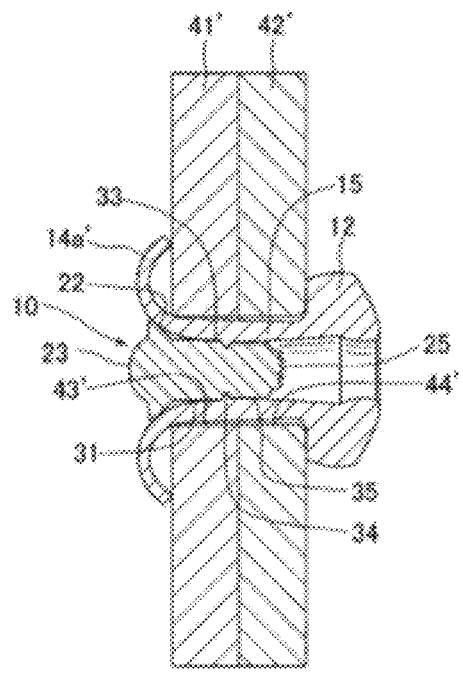
FIG. 6 is a cross sectional view after a thick workpiece has been fastened by means of the blind rivet in FIG. 1.

FIG. 6 is a cross-sectional diagram showing thick workpieces 41', 42' after they have been fastened by the blind rivet of the working example in the present invention. In thick workpieces 41', 42', as cutting edge portion 22 and mandrel head 23 near the surface of workpiece 41', mandrel 20 can be pulled in no farther, mandrel 20 breaks at breaking portion 25 and the rivet body 10 and the remainder of mandrel 20 are tightly secured.

When the thick workpieces 41', 42' of FIG. 6 are used, the tips of expanded diameter portion 14a', which has been cut and split by cutting edge portion 22, abut the surface of the periphery of attaching hole 43' of workpiece 41'. Securing and attaching groove 34 of mandrel 20 is pulled within attaching hole 43' of workpiece 41'.

Figure 7:
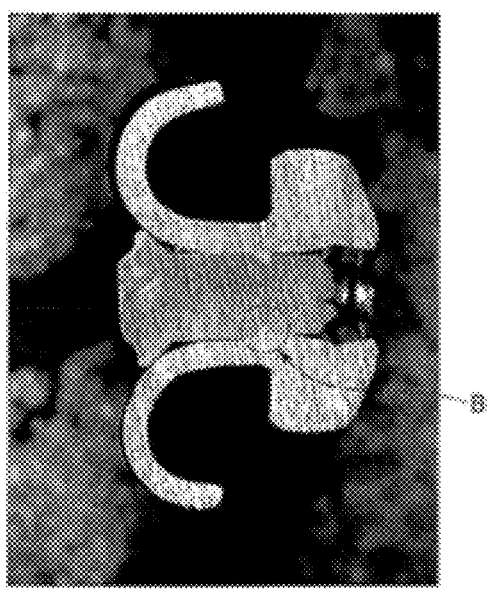
FIG. 7 is a cross sectional photograph after a thin workpiece has been fastened by means of the blind rivet which is the working example of the present invention.
Figure 8:
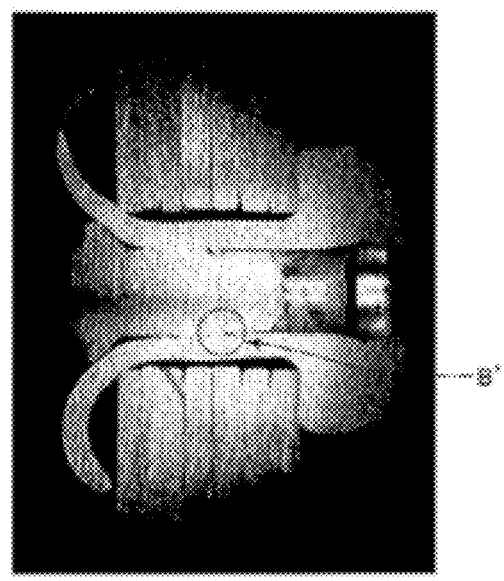
FIG. 8 is a cross sectional photograph after a thick workpiece has been fastened by means of the blind rivet which is the working example of the present invention.

FIG. 7 and FIG. 8 show a working example of the present invention. All the dimensions of the blind rivet of the present invention is given in Table 2, shown above. FIG. 7 is a cross-sectional photograph after thin workpieces have been fastened by the blind rivet of the working example in the present invention. The total thickness of the workpieces is 1.5 mm.

There is still some distance from the mandrel head and the cutting edges to the workpiece. The tips of the expanded diameter portion, which has been cut and split by the cutting edges, abut the surface of the periphery of the attaching hole of the workpiece, and the mandrel cannot be pulled in farther. There is a securing and attaching groove at the portion shown by B in FIG. 7, and it can be seen that the material of the thick portion undergoes metal flow and enters the securing and attaching groove.

FIG. 8 is a cross-sectional photograph after thick workpieces have been fastened by means of the blind rivet of the working example of the present invention. The total thickness of the workpieces is 5.5 mm.

As the mandrel head and cutting edges near the surface of the workpiece, the mandrel cannot be pulled in farther. Because the board thickness in the case of FIG. 8 is extremely thick, the tips of the expanded diameter portion, which has been cut and split by the cutting edges, do not abut the surface of the periphery of the attaching hole of the workpiece. There is a securing and attaching groove at the portion shown by B' in FIG. 8, and it can be seen that the material of the thick portion undergoes metal flow and enters the securing and attaching groove.

Since part of the material of the rivet body enters the securing and attaching groove of the mandrel and is secured and attached, the blind rivet of the present invention can securely fasten a workpiece. Breakage of the rivet body is controlled, and no defects occur during fastening, such as happens when a broken portion of the mandrel projects from the flange side or the mandrel head falls off.

Furthermore, if the middle diameter portion wedges into the thick portion, securing can be done for wide positions in the axial direction, enabling workpieces with a broad range of thickness to be fastened.

In addition, there is no plurality of raised and indented portions on the mandrel which mesh with the rivet body; as a result, the mandrel can be pulled into the through hole of the rivet body under a light load.

The invention claimed is:

1. A blind rivet comprising: a rivet body having a hollow sleeve, the sleeve having a flange formed on a first end thereof, the sleeve including a second end opposite the first end, the sleeve further including a through hole from the first end to the second end; a mandrel having a long, narrow shaft with an outer diameter smaller than the inner diameter of the sleeve, a mandrel head having an outer diameter larger than the inner diameter of the sleeve, and a cutting edge portion on a shaft side of the mandrel head; the sleeve of the rivet body having a first portion toward the first sleeve end, the first portion including a first wall thickness, and a second portion at the second sleeve end, the second portion having a wall thickness that is smaller than the first portion, the second portion further including an larger inner diameter than the first portion, the shaft of the mandrel having a large diameter portion contiguous to the cutting edge portion, a middle diameter portion that is contiguous to the large diameter portion and that has an outer diameter smaller than the large diameter portion, a small diameter portion having an outer diameter smaller than the middle diameter portion, a breaking portion having an outer diameter smaller than the small diameter portion, and a securing and attaching groove positioned between the middle diameter portion and the small diameter portion, which has an outer diameter smaller than the small diameter portion, wherein during installation the cutting edge portion cuts open the sleeve.

2. The blind rivet of claim 1, wherein the outer diameter of the large diameter portion is equal to or larger than the inner diameter of the second portion; the outer diameter of the middle diameter portion is smaller than the inner diameter of the second portion, but larger than the inner diameter of the first portion.

3. The blind rivet of claim 2, wherein the outer diameter of the small diameter portion is smaller than the inner diameter of the first portion.

4. The blind rivet of claim 3, wherein part of the material of the first portion enters a securing and attaching groove, so that the mandrel head is securely attached to the rivet body.

5. The blind rivet of claim 4, wherein the breaking portion of the mandrel breaks after the mandrel head is securely attached to the rivet body.

6. A mandrel for collapsing a rivet body to form a blind rivet, the rivet body having a hollow sleeve and a flange formed on one end of the sleeve, the mandrel comprising: a narrow shaft, a mandrel head at a first shaft end having an outer diameter larger than the shaft, the mandrel further including a second end opposite the first end, the mandrel head having a cutting edge toward the first side; the shaft including a large diameter portion which is contiguous to the cutting edge portion, a middle diameter portion contiguous to the large diameter portion, the middle diameter portion having outer diameter smaller than the large diameter portion; a small diameter portion having an outer diameter smaller than the middle diameter portion, a breaking portion having an outer diameter smaller than the small diameter portion, and a securing and attaching groove positioned between the middle diameter portion and the small diameter portion, the securing groove having an outer diameter smaller than the small diameter portion, wherein during installation the mandrel head cuts open the sleeve.

7. A method of fastening a blind rivet to a hole in a workpiece, the method including the steps of:

providing a rivet body and a mandrel, the rivet body having a hollow sleeve with a thick portion, the rivet body further including a thin portion having an inner diameter larger than the thick portion inner diameter, a flange formed on a first end of the sleeve, the sleeve further including a second end opposite the first sleeve end, and a through hole formed in the rivet body from the first end to the second end;

the mandrel including a shaft and a mandrel head, the shaft having a large diameter portion which is contiguous to the mandrel head, a middle diameter portion having an outer diameter smaller than the large diameter portion, a small diameter portion having an outer diameter smaller than the middle diameter portion, a breaking portion having an outer diameter smaller than the small diameter portion, and a securing and attaching groove which is between the middle diameter portion and the small diameter portion, the securing and attaching groove having an outer diameter smaller than the small diameter portion; the outer diameter of the mandrel head being larger than inner diameter of the sleeve, and a cutting edge portion is formed on the shaft side for cutting open the sleeve;

assembling the rivet body and mandrel so that the shaft of the mandrel passes through the through hole of the rivet body;

inserting the blind rivet into the attaching hole of the workpiece from the mandrel head, and the sleeve side surface of the flange is made to abut the periphery of the attaching hole of the workpiece;

pulling the shaft of the mandrel out from the flange side while supporting the flange, cutting open the end of the sleeve via the cutting edges of the cutting edge portion to and expand the sleeve diameter, and forcing a part of the material of the thick portion to enter the securing and attaching groove; the mandrel and rivet body being joined, breaking the mandrel at the breaking portion, and fastening the workpiece between the end portion of the sleeve (which has expanded in diameter) and the flange.

* * * * *